United States Patent
Yeats et al.

(10) Patent No.: US 10,746,300 B2
(45) Date of Patent: Aug. 18, 2020

(54) PISTON ASSEMBLY FOR AN UNLOADER VALVE OF AN AIR COMPRESSOR

(71) Applicant: Bendix Commercial Vehicle Systems LLC, Elyria, OH (US)

(72) Inventors: Padraig B. Yeats, Avon Lake, OH (US); Shane A. Harte, Westlake, OH (US); Jeffrey M. Geither, North Ridgeville, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 19 days.

(21) Appl. No.: 15/833,384

(22) Filed: Dec. 6, 2017

(65) Prior Publication Data
US 2018/0094725 A1 Apr. 5, 2018

Related U.S. Application Data

(63) Continuation of application No. 14/682,430, filed on Apr. 9, 2015.

(51) Int. Cl.
 *B60T 17/02* (2006.01)
 *F04B 39/10* (2006.01)
 (Continued)

(52) U.S. Cl.
 CPC ............ *F16J 1/10* (2013.01); *B60T 17/02* (2013.01); *F04B 35/01* (2013.01); *F04B 39/10* (2013.01); *F04B 49/225* (2013.01)

(58) Field of Classification Search
 None
 See application file for complete search history.

(56) References Cited

U.S. PATENT DOCUMENTS

| | | | |
|---|---|---|---|
| 3,796,228 A * | 3/1974 | Bedo | F16K 17/04 137/536 |
| 4,026,122 A * | 5/1977 | Kuhn | F04B 49/243 62/196.3 |

(Continued)

FOREIGN PATENT DOCUMENTS

| | | |
|---|---|---|
| CN | 1400387 A | 3/2003 |
| CN | 101128647 A | 2/2008 |

(Continued)

OTHER PUBLICATIONS

Bendix Service Data, BA-921 Compressor (Bendix Commercial Vehicle Systems, 2007), received as applicant submitted prior art in the parent U.S. Appl. No. 14/682,430.*

*Primary Examiner* — Peter J Bertheaud
*Assistant Examiner* — Geoffrey S Lee
(74) *Attorney, Agent, or Firm* — Cheryl Greenly; Brian Kondas; Eugene Clair

(57) ABSTRACT

A piston assembly is provided for an unloader valve of an air compressor. The assembly comprises an unloader piston having a first bore of a first diameter, and a second bore of a second diameter which is smaller than the diameter of the first bore. The assembly also comprises a coil spring having a central opening, one end portion disposed in the second bore, and an opposite end portion extending into the first bore. The assembly further comprises a balance piston including a head portion sized to be disposed in the first bore, a first stem portion extending from the head portion and having a diameter smaller than the first and second bores, and a second stem portion extending from the first stem portion and extending into the central opening of the coil spring and having a diameter smaller than the first stem portion.

12 Claims, 2 Drawing Sheets

(51) Int. Cl.
*F04B 49/22* (2006.01)
*F04B 35/01* (2006.01)
*F16J 1/10* (2006.01)

(56) References Cited

U.S. PATENT DOCUMENTS

| | | | | |
|---|---|---|---|---|
| 4,030,713 | A | * | 6/1977 | Palmer ................. B60G 15/063 |
| | | | | 188/314 |
| 4,057,072 | A | | 11/1977 | Cook |
| 4,969,542 | A | * | 11/1990 | Athmer ..................... F16F 9/38 |
| | | | | 188/322.12 |
| 6,460,839 | B2 | * | 10/2002 | Muller .................... E05F 5/022 |
| | | | | 16/66 |
| 6,475,710 | B2 | | 11/2002 | Kudo et al. |
| 7,718,907 | B2 | | 5/2010 | Wildman |
| 7,874,820 | B2 | | 1/2011 | Shoulders |
| 8,196,597 | B2 | | 6/2012 | Ho |
| 9,347,578 | B2 | * | 5/2016 | Dang .................... F16K 15/063 |
| 2003/0032507 | A1 | * | 2/2003 | Lacroix ................. A63B 41/00 |
| | | | | 473/593 |
| 2006/0191755 | A1 | * | 8/2006 | Fritz ....................... F16F 1/128 |
| | | | | 188/266 |
| 2007/0187197 | A1 | * | 8/2007 | Imaeda ..................... F16F 9/38 |
| | | | | 188/322.12 |
| 2009/0107781 | A1 | * | 4/2009 | Fritz ....................... F16F 9/585 |
| | | | | 188/280 |
| 2010/0139634 | A1 | * | 6/2010 | Wade ................. F01M 13/0011 |
| | | | | 123/574 |
| 2014/0283922 | A1 | * | 9/2014 | Strom ................... B22F 3/1055 |
| | | | | 137/87.04 |
| 2014/0345711 | A1 | | 11/2014 | Ueno |
| 2017/0028804 | A1 | * | 2/2017 | Lindemann ............... F16F 9/38 |

FOREIGN PATENT DOCUMENTS

| | | |
|---|---|---|
| CN | 201377421 Y | 1/2010 |
| CN | 101285464 B | 12/2010 |
| CN | 104145146 A | 11/2014 |
| EP | 0240278 A2 | 10/1991 |
| MX | 2009013245 A | 1/2010 |

* cited by examiner

PISTON ASSEMBLY FOR AN UNLOADER VALVE OF AN AIR COMPRESSOR

CROSS-REFERENCE TO RELATED APPLICATIONS

The present application is a continuation of U.S. patent application Ser. No. 14/682,430 "Piston Assembly for Unloader Valve of an Air Compressor" filed Apr. 9, 2015. The entire disclosure of the aforementioned application is herein expressly incorporated by reference.

BACKGROUND

The present application relates to unloader valves of air compressors, and is particularly directed to a piston for an unloader valve of an air compressor such as a vehicle air compressor used in an air braking system of a heavy vehicle like a truck.

A truck air braking system includes a vehicle air compressor which builds air pressure for the air braking system. A governor controls system air pressure between a preset maximum and minimum pressure level by monitoring the air pressure in a supply reservoir. When the supply reservoir air pressure becomes greater than that of a preset "cut-out" setting of the governor, the governor controls the compressor to stop the compressor from building air. As the supply reservoir air pressure drops to a preset "cut-in" setting of the governor, the governor returns the compressor back to building air.

The vehicle air compressor is typically a reciprocating air compressor and runs continuously. The compressor runs either in a loaded mode or an unloaded mode. When the compressor is running in the loaded mode, compressed air is delivered to the air braking system. When the compressor is running in the unloaded mode, compressed air is directed to an alternate place which is other than the air braking system. Also, when the compressor is running in the unloaded mode, an unloader valve releases pressurized air building up inside the compressor to reduce the pressurized air in the compressor, which in turn reduces the load on the device driving the compressor. This minimizes power consumption during operation of the compressor in the unloaded mode.

One type of unloader valve includes a balance piston having a stem portion which extends into central opening of a coil spring which, in turn, extends into a larger diameter bore of an unloader piston. The spring may buckle and press against the stem portion of the balance piston. More specifically, air flows back-and-forth between two chambers of the unloader valve as the compressor piston operates back and forth during the loaded mode.

The back-and-forth movement of air flow into and out of the larger diameter bore of the unloader piston takes a finite amount of time to travel up and down the individual coils of the spring, resulting in a pressure differential along the length of the spring. This pressure differential along the length of the spring causes the spring to vibrate. Since the spring may be buckled and pressed against the stem portion of the balance piston, the vibrations of the spring tend to cause premature wear of the stem portion of the balance piston. It would be desirable to provide an unloader valve which overcomes drawbacks of known unloader valves which use a balance piston.

SUMMARY

In accordance with one embodiment, a piston assembly is provided for an unloader valve of an air compressor. The piston assembly comprises an unloader piston having (i) a first bore of a first diameter, and (ii) a second bore of a second diameter which is smaller than the diameter of the first bore. The piston assembly also comprises a coil spring having a central opening, one end portion disposed in the second bore of the unloader piston, and an opposite end portion extending into the first bore of the unloader piston. The piston assembly further comprises a balance piston including (i) a head portion having a diameter sized to be disposed in the first bore of the unloader piston, (ii) a first stem portion extending from the head portion and having a diameter smaller than the diameter of the first and second bores of the unloader piston, and (iii) a second stem portion extending from the first stem portion and extending into the central opening of the coil spring and having a diameter smaller than the diameter of the first stem portion.

In accordance with another embodiment, an unloader valve apparatus is provided for an air compressor. The unloader valve apparatus comprises an unloader piston having a longitudinal central axis and movable along the longitudinal central axis between a loaded position and an unloaded position, and a coil spring having a central opening and disposed in the unloader piston. The unloader valve apparatus further comprises a balance piston including (i) a head for supporting movement of the unloader piston between the loaded position in which the unloader piston blocks an unloader port and the unloaded position in which the unloader piston is not blocking the unloader port, and (ii) a stem extending from the head and including means for reducing wear of the stem as the coil spring vibrates when the unloader piston is in the loaded positon.

In accordance with yet another embodiment, a vehicle air compressor apparatus is provided for a heavy vehicle braking system. The vehicle air compressor apparatus comprises a compressor crankcase assembly and a compressor cylinder head assembly disposed on the crankcase assembly and co-operating with the crankcase assembly to generate compressed air. The cylinder head assembly includes (i) an air inlet port through which air can be received for compression within the crankcase and cylinder head assemblies, (ii) a discharge port through which compressed air can be delivered from the cylinder head assembly, and (iii) an unloading passage. The vehicle air compressor apparatus further comprises an unloader valve assembly connected internally of the crankcase and cylinder head assemblies. The unloader valve assembly includes (i) a coil spring including opposite end portions and a central opening extending between the opposite end portions, (ii) an unloader piston having a bore in which one of the opposite end portions of the coil spring is disposed, and (iii) a balance piston including a first stem portion having a first diameter and a second stem portion having a diameter which is different from the diameter of the first stem portion, wherein the first and second stem portions are disposed in the central opening at one of the opposite end portions of the coil spring.

DETAILED DESCRIPTION

Figure 1:
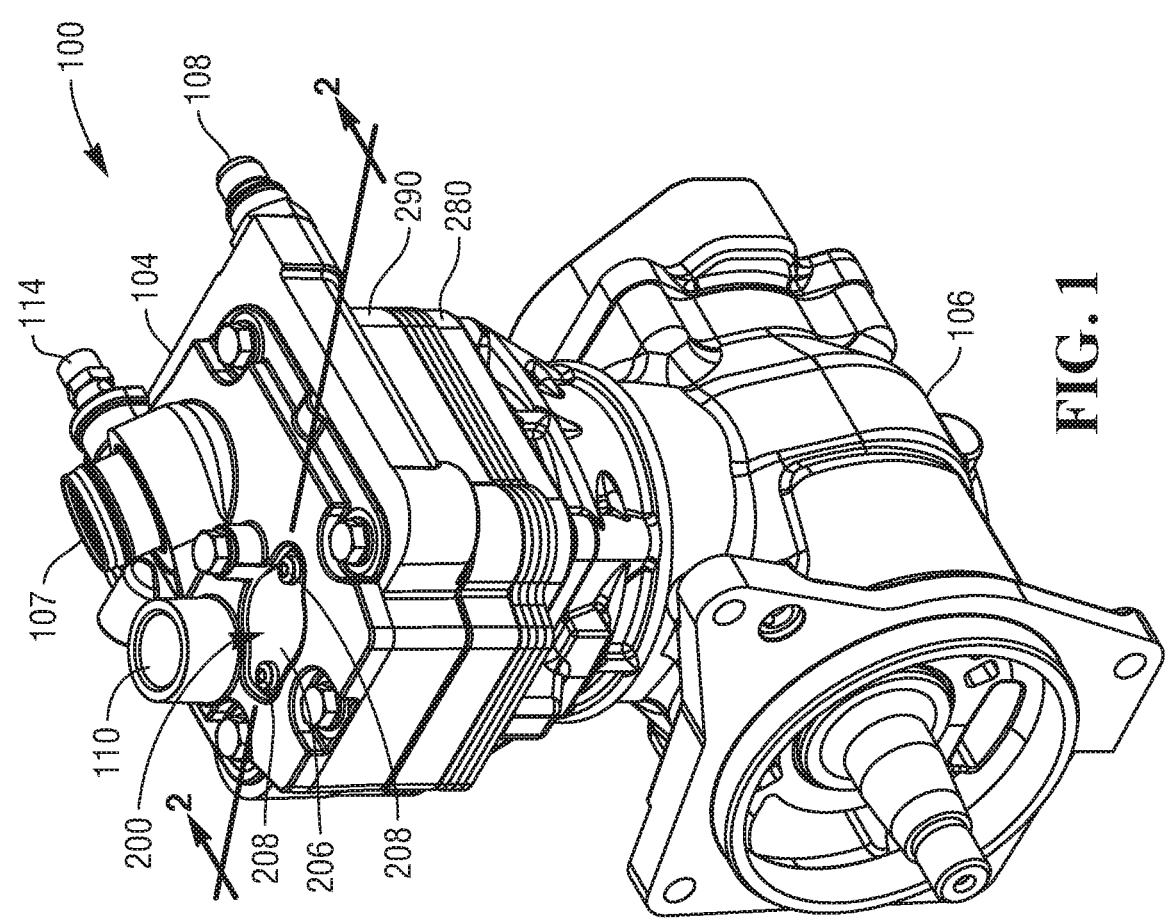
FIG. 1 is a perspective view of a vehicle air compressor including an unloader valve apparatus constructed in accordance with an embodiment.

Referring to FIG. 1, air compressor 100 includes compressor cylinder head assembly 104 disposed on compressor crankcase assembly 106 in known manner. Components of crankcase assembly 106 and components of cylinder head assembly 104 co-operate together to generate compressed air. Compressor 100 may be based on design of a Bendix® BA-921® Compressor commercially available from Bendix Commercial Vehicle Systems LLC located in Elyria, Ohio.

Cylinder head assembly 104 includes air inlet port 107 through which air can be received for compression within the crankcase assembly 106 and cylinder head assembly 104. Cylinder head assembly 104 includes discharge port 110 (i.e., an air outlet port) through which compressed air can be delivered from cylinder head assembly 104. A pair of coolant ports 108 (only one cooling port is shown in FIG. 1) is provided through which coolant can flow to cool cylinder head assembly 104 as compressed air is being generated. Cylinder head assembly 104 further includes safety valve port 114, and governor port (not shown) which is connectable via a pneumatic control line (not shown) to a governor (also not shown).

Compressor 100 further includes unloader valve assembly 200 which is disposed between crankcase assembly 106 and cylinder head assembly 104. Unloader valve assembly 200 adjoins valve plate 280 which adjoins crankcase assembly 106 and cooling plate 290 which adjoins cylinder head assembly 104 and is on valve plate 280. Cover plate 206 is fastened to cylinder head assembly 104 with a pair of fasteners, such as screws 208.

Figure 2:
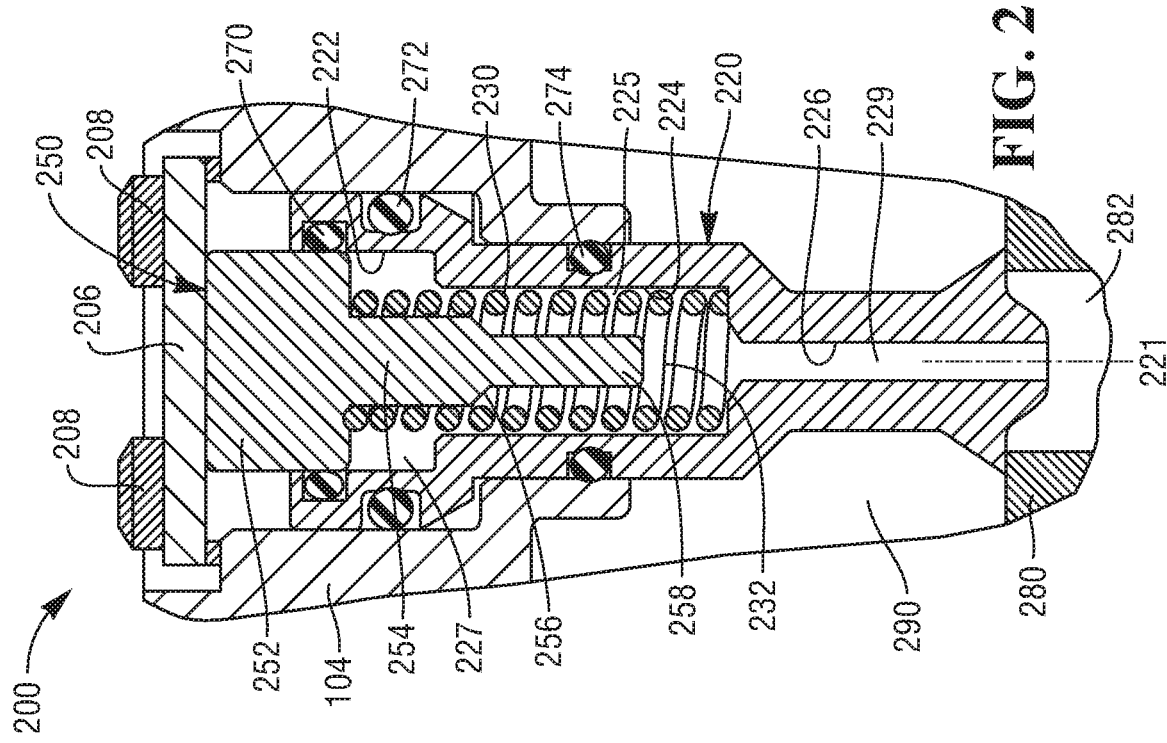
FIG. 2 is a sectional view, taken approximately along line 2-2 shown in FIG. 1, and showing parts of the unloader valve apparatus.
Figure 4:
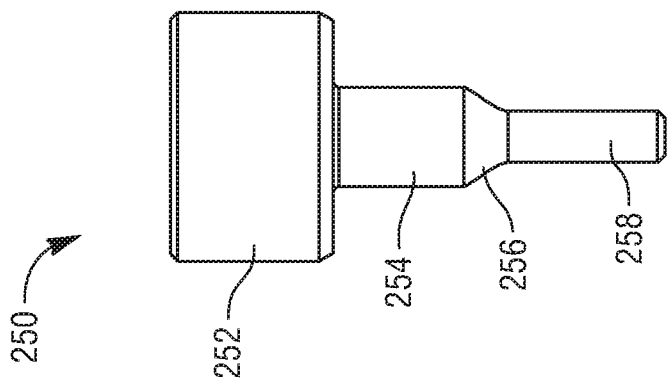
FIG. 4 is an elevational view of a balance piston of the piston assembly shown in FIG. 3.
Figure 3:
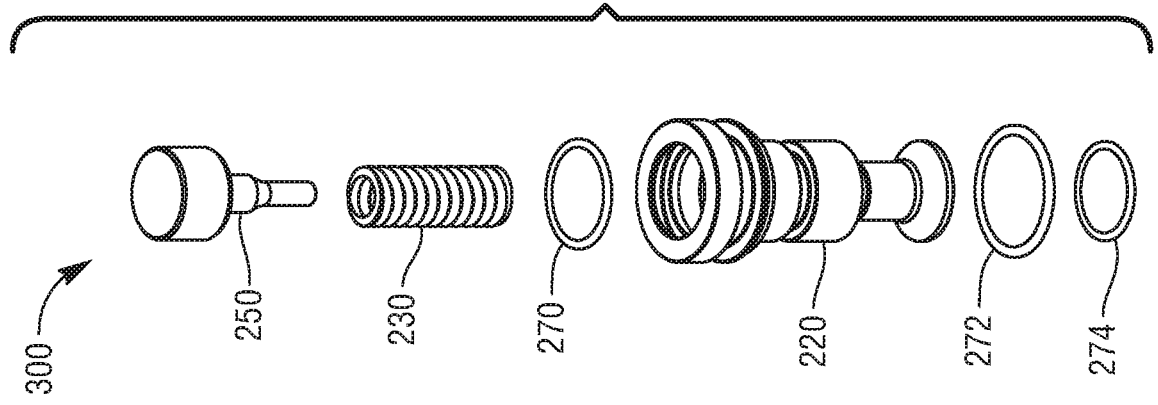
FIG. 3 is a perspective view, looking approximately into the page from the top of FIG. 2, and showing certain parts which comprise a piston assembly in an exploded view.

Referring to FIG. 2, a sectional view is taken approximately along line 2-2 shown in FIG. 1, and shows parts of unloader valve assembly 200. Referring to FIG. 3, a perspective view, looking approximately into the page from the top of FIG. 2, is illustrated. The perspective view of FIG. 3 shows certain parts which comprise piston assembly 300 in an exploded view. Referring to FIG. 4, an elevational view of balance piston 250 of piston assembly 300 of FIG. 3 is illustrated.

Referring to FIGS. 2 and 3, generally cylindrical unloader piston 220 has longitudinal central axis 221, and is movable along longitudinal central axis 221 between a seated position (on valve plate 280) shown in FIG. 2 (which corresponds to compressor 100 running in loaded mode) and an unseated position (not shown and which corresponds to compressor 100 running in unloaded mode). Unloader piston 220 has an end portion having first bore 222 which defines chamber 227, an intermediate portion having second bore 224 which defines chamber 225, and an opposite end portion having third bore 226 which defines chamber 229. First bore 222 has larger diameter than second bore 224 which, in turn, has larger diameter than third bore 226.

Balance piston 250 includes head portion 252 (FIGS. 2 and 4), first stem portion 254 which extends from head portion 252, second stem portion 258, and tapered stem portion 256 which interconnects first and second stem portions 254, 258. Second stem portion 258 has a relatively smaller diameter than diameter of first stem portion 254. First and second stem portions 254, 258 along with tapered stem portion 256 extend into central opening 232 of coil spring 230 as shown in FIG. 2.

A first seal, such as first O-ring 270, is disposed in a seal cavity disposed in an inner diameter bearing surface of unloader piston 220. First O-ring 270 provides an air-tight seal between an outer diameter bearing surface of head portion 252 of balance piston 250 and an inner diameter bearing surface of unloader piston 220 within chamber 227 defined by first bore 222 of unloader piston 220. First O-ring 270 provides an air-tight seal to support up-and-down movement of unloader piston 220 relative to balance piston 250.

A second seal, such as second O-ring 272, is disposed in another seal cavity disposed in a first outer diameter bearing surface of unloader piston 220. Second O-ring 272 provides an air-tight seal between the first outer diameter bearing surface of unloader piston 220 and a first inner diameter bearing surface of cylinder head assembly 104 of compressor 100.

A third seal, such as third O-ring 274, is disposed in yet another seal cavity disposed in a second outer diameter bearing surface of unloader piston 220. Third O-ring 274 provides an air-tight seal between the second outer diameter bearing surface of unloader piston 220 and a second inner diameter bearing surface of cylinder head assembly 104 of compressor 100. Second and third O-rings 272, 274 provide an air-tight seal to support up-and-down movement of unloader piston 220 relative to body of cylinder head assembly 104.

One end of coil spring 230 is disposed in chamber 225 of second bore 224 of unloader piston 220. The opposite end of coil spring 230 extends into chamber 227 of first bore 222 of unloader piston 220 as shown in FIG. 2. The one end of coil spring 230 abuts a surface of unloader piston 220 and the opposite end of coil spring 230 abuts a surface of balance piston 250. The combination of components (shown in FIG. 3) including unloader piston 220, balance piston 250, coil spring 230, and the first, second, and third O-rings 270, 272, 274 comprise piston assembly 300.

Balance piston 250 is used to provide a volume space into which air flows to create sufficient air pressure which pushes unloader piston 220 downward from an unseated position (i.e., the unloaded mode of compressor 100) towards the seated position (i.e., the loaded mode of compressor 100) shown in FIG. 2. The volume space needs to be maintained at a minimum because otherwise it will impact the flow rate of compressor 100. Material of first and second portions 254, 258 of balance piston 250 may comprise any type of material other than plastic. For example, first and second portions 254, 258 may comprise a metallic material such as brass.

When compressor 100 is running in loaded mode, unloader piston 220 is in the seated position shown in FIG. 2. When compressor 100 is running in unloaded mode, unloader piston 220 is in an unseated position (not shown). The seated position of unloader piston 220 shown in FIG. 2 will be referred to as the loaded position, the loaded mode, or the blocking position. The unseated position of unloader piston 220 will be referred to as the unloaded position, the unblocking position, or the non-blocking position.

During operation of unloader valve assembly 200, unloader piston 220 is responsive to a control signal pressure from governor port of governor (not shown). Unloader piston 220 moves to the unseated position in response to the control signal pressure. Compressed air from unloading passage 282 in valve plate 280 flows into chambers 229, 225, 227 of unloader piston 220. This air pressure from unloading passage 282 causes unloader piston 220 to be pushed against bias of coil spring 230 from an unseated position (not shown) to the seated position (shown in FIG.

2). Unloader piston 220 returns to the seated position when the control signal pressure is removed from governor port of governor. Operation of unloader valve assembly 200 is conventional and, therefore, will not be further described.

Figure 5:
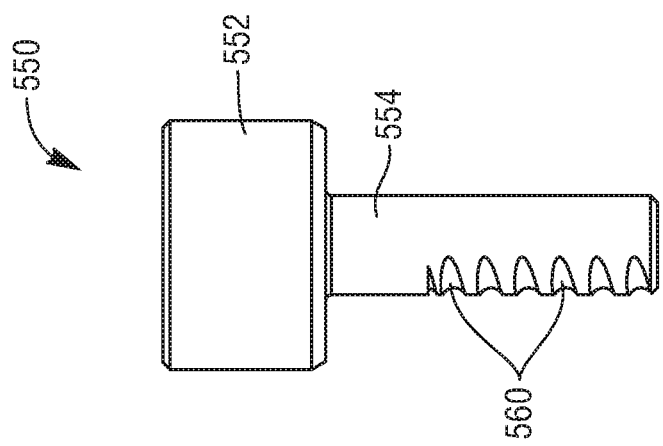
FIG. 5 is a view similar to FIG. 4 and showing a balance piston in the prior art.

Advantageous results of the above-described embodiment can be illustrated by comparing balance piston 250 shown in FIG. 4 with a prior art balance piston 550 shown in FIG. 5. Prior art balance piston 550 includes head portion 552 and stem portion 554 extending from head portion 552. Stem portion 554 has a uniform diameter along entire length of stem portion 554.

During operation of unloader valve assembly 200 (FIG. 2) which would embody prior art balance piston 550 (FIG. 5) instead of balance piston 250 (FIG. 4), coil spring 230 may buckle and the inner diameter surface of coil spring 230 tends to press against the outer surface of stem portion 554 of prior art balance piston 550. Buckling of coil spring 230 produces a sideways force on prior art balance piston 550 between the inner diameter of coil spring 230 and the outer diameter of stem portion 554 of prior art balance piston 550, thereby creating a wear pattern such as shown by reference numeral 560 shown in FIG. 5.

More specifically, this buckling and tendency of coil spring 230 to press against outer surface of stem portion 554 of prior art balance piston 550 are caused by back-and-forth air flow through chamber 225 between chamber 227 and chamber 229 of unloader piston 220 as compressor piston (not shown) of compressor 100 operates in a loaded mode. This movement of air flow takes a finite amount of time to travel up and down individual coils of coil spring 230 resulting in a pressure differential along length of coil spring 230. The pressure differential causes coil spring 230 to vibrate which, in turn, tends to cause premature wear along length of stem portion 554 of prior art balance piston 550 as shown in FIG. 5.

However, such a wear pattern 560 shown in prior art balance piston 550 of FIG. 5 is absent from the embodiment of balance piston 250 shown in FIG. 4. The absence of wear pattern in balance piston 250 of FIG. 4 is attributable to the relatively smaller diameter stem portion 258 being connected through tapered stem portion 256 to the relatively larger diameter stem portion 254. Tapered stem portion 256 is designed such that the buckling of coil spring 230 is away from the edges of the taper.

It should be noted that when unloader piston 220 is in the seated positon as shown in FIG. 2, (i.e., compressor 100 is running in loaded mode), the type of vibrations described hereinabove are present. However, when unloader piston 220 is in the unseated position (i.e., compressor 100 is running in unloaded mode), the type of vibrations described hereinabove are absent.

A number of advantages result by providing unloader valve assembly 200 constructed in accordance with the above-described embodiment. One advantage is that the relatively smaller diameter second stem portion 258 of balance piston 250 provides a sufficient gap between outer surface of second stem portion 258 and inner surface of individual coils of coil spring 230 such that vibrations of coil spring 230 do not cause outer surface of second stem portion 258 to prematurely wear. More specifically, tapered stem portion 256 assists unloader piston 220 in equalizing pressure, which prevents auto-lifting and turbulent air which tends to cause coil spring 230 to wobble. Accordingly, the contour of balance piston 250 including second stem portion 258 which has a relatively smaller diameter than the relatively larger diameter of first stem portion 254 provides an unloader valve assembly which lasts longer. The result is less time and cost involved in servicing compressor 100 when unloader valve assembly 200 needs to be serviced.

Another advantage is that piston assembly 300 shown in FIG. 3 can be easily retrofitted to existing unloader valve assemblies which do not have a tapered stem portion which interconnects a relatively smaller diameter stem portion and a relatively larger diameter stem portion. The result for these known unloader valve assemblies is longer periods of time between when servicing or replacement of parts is needed.

Although the above-description describes balance piston 250 having a tapered shape as best shown in the view of FIG. 4, it is conceivable that balance piston 250 may have a different tapered shape. It is also conceivable that the ratio of the relatively smaller diameter stem portion 258 to the relatively larger diameter stem portion 254 may vary from the proportions shown in FIGS. 2-4. It should be noted that relative diameters are shown exaggerated in FIG. 4 for purpose of better illustrating balance piston 250. The taper may be any shape from a straight line to a spline form between the first and second stem portions 254, 258.

Also, although the above-description describes a particular commercially-available model of compressor which has been modified to provide the above-described embodiment of balance piston 250 with unloader piston 220, it is conceivable that a new compressor can be manufactured to provide advantageous results described hereinabove.

Further, although the above-description describes unloader valve assembly 200 being used in a heavy vehicle such as a truck, it is conceivable that unloader valve assembly 200 may be used in other types of heavy vehicles, such as busses for example.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A piston assembly for an unloader valve of an air compressor, the piston assembly comprising:

an unloader piston having a first bore of a first diameter and a second bore of a second diameter, wherein the unloader piston is movable from a loaded position to an unloaded position; a coil spring having a central opening, a first end portion disposed in the first bore of the unloader piston, and a second end portion extending into the second bore of the unloader piston, wherein the coil spring biases the unloader piston into the loaded position; and a balance piston comprising: a head portion having a diameter sized to be disposed in the first bore of the unloader piston wherein the coil spring first end portion abuts a shoulder of the head portion; a first stem portion extending from the head portion into the central opening of the coil spring; a tapered stem portion extending from the first stem portion, wherein the tapered stem portion is located at an approximate central location within the central opening of the coil spring when the unloader piston is in the loaded position; and a second stem portion extending from the tapered stem portion into the central opening of the coil spring and the second bore of the unloader piston, wherein the diameter of the second stem portion is smaller than the diameter of the first stem portion thereby providing a gap between the second stem portion and the coil spring, wherein the first stem portion, the tapered stem portion and the second stem portion are sized to maintain a minimal volume with respect to the unloader piston; wherein the unloader piston is responsive to a control signal pressure to move the unloader piston against bias of the coil spring while the balance piston remains stationary and the coil spring remains in contact with the head portion and does not contact the second stem portion as the unloader piston moves from the loaded position to the unloaded position wherein the first stem portion contacts an inner diameter of the coil spring, the coil spring extending from the shoulder of the head portion into the second bore beyond a free end of the second stem portion.

2. The piston assembly as in claim 1, further comprising:
a first seal disposed in a first seal cavity disposed in an inner diameter bearing surface of the unloader piston to provide an air-tight seal between an outer diameter bearing surface of the head portion of the balance piston and an inner diameter bearing surface within the first bore of the unloader piston.

3. The piston assembly as in claim 2, wherein the head portion of the balance piston partially extends outside of the first bore of the unloader piston when the unloader piston is in the loaded position and the first seal maintains the air-tight seal against the outer diameter bearing surface of the head portion as the unloader piston moves from the loaded position to the unloaded position.

4. The piston assembly as in claim 2, further comprising:
a second seal disposed in a second seal cavity disposed in a first outer diameter bearing surface of the unloader piston to provide an air-tight seal between the first outer diameter bearing surface of the unloader piston and a first inner diameter bearing surface of a cylinder head of the air compressor.

5. The piston assembly as in claim 4, further comprising:
a third seal disposed in a third seal cavity disposed in a second outer diameter bearing surface of the unloader piston to provide an air-tight seal between the second outer diameter bearing surface of the unloader piston and a second inner diameter bearing surface of the cylinder head of the air compressor.

6. The piston assembly as in claim 1, wherein the head portion of the balance piston partially extends outside the first bore of the unloader piston when the unloader piston is in the loaded position.

7. A vehicle air compressor apparatus for a heavy vehicle braking system, the vehicle air compressor apparatus comprising: a compressor crankcase assembly; a compressor cylinder head assembly disposed on the crankcase assembly and co-operating with the crankcase assembly to generate compressed air, wherein the cylinder head assembly includes (i) an air inlet port through which air can be received for compression within the crankcase and cylinder head assemblies, (ii) a discharge port through which compressed air can be delivered from the cylinder head assembly; and (iii) an unloading passage; and an unloader valve assembly installed in a cavity of the cylinder head assembly comprising: an unloader piston having a first bore of a first diameter and a second bore of a second diameter, wherein the unloader piston is movable from a loaded position to an unloaded position; a coil spring having a central opening, a first end portion disposed in the first bore of the unloader piston, and a second end portion extending into the second bore of the unloader piston, wherein the coil spring biases the unloader piston into the loaded position; and a balance piston comprising: a head portion having a diameter sized to be disposed in the first bore of the unloader piston wherein the coil spring first end portion abuts a shoulder of the head portion; a first stem portion extending from the head portion into the central opening of the coil spring; a tapered stem portion extending from the first stem portion, wherein the tapered stem portion is located at an approximate central location within the central opening of the coil spring when the unloader piston is in the loaded position; and a second stem portion extending from the tapered stem portion into the central opening of the coil spring and the second bore of the unloader piston, wherein the diameter of the second stem portion is smaller than the diameter of the first stem portion thereby providing a gap between the second stem portion and the coil spring, wherein the first stem portion, the tapered stem portion and the second stem portion are sized to maintain a minimal volume with respect to the unloader piston; wherein the balance piston remains stationary and the coil spring remains in contact with the head portion and does not contact the second stem portion as the unloader piston moves from the loaded position to the unloaded position wherein the first stem portion contacts an inner diameter of the coil spring, the coil spring extending from the shoulder of the head portion into the second bore beyond a free end of the second stem portion.

8. The vehicle air compressor apparatus as in claim 7, wherein the unloader piston is movable against the biasing force of the coil spring between the loaded position in which compressed air is blocked from leaving the unloading passage as compressed air is being delivered through the discharge port and the unloaded position in which compressed air is allowed to be unloaded from the crankcase and cylinder head assemblies.

9. The vehicle air compressor apparatus as in claim 7, further comprising:
a first seal disposed in a first seal cavity disposed in an inner diameter bearing surface of the unloader piston to provide an air-tight seal between an outer diameter bearing surface of the head portion of the balance piston and an inner diameter bearing surface within the first bore of the unloader piston.

10. The vehicle air compressor apparatus as in claim 9, wherein the head portion of the balance piston partially extends outside of the first bore of the unloader piston when the unloader piston is in the loaded position and the first seal maintains the air-tight seal against the outer diameter bearing surface of the head portion as the unloader piston moves from the loaded position to the unloaded position.

11. The vehicle air compressor apparatus as in claim 7, further comprising:
a second seal disposed in a second seal cavity disposed in a first outer diameter bearing surface of the unloader piston to provide an air-tight seal between the first outer diameter bearing surface of the unloader piston and a first inner diameter bearing surface of the cylinder head assembly.

12. The vehicle air compressor apparatus as in claim 11, further comprising:
a third seal disposed in a third seal cavity disposed in a second outer diameter bearing surface of the unloader piston to provide an air-tight seal between the second outer diameter bearing surface of the unloader piston and a second inner diameter bearing surface of the cylinder head assembly.

\* \* \* \* \*